(12) United States Patent
Buchholz

(10) Patent No.: US 11,702,993 B2
(45) Date of Patent: Jul. 18, 2023

(54) STRUCTURAL ASSEMBLY FOR A GAS TURBINE ENGINE

(71) Applicant: Rolls-Royce Deutschland Ltd & Co KG, Blankenfelde-Mahlow (DE)

(72) Inventor: Carsten Buchholz, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/623,110

(22) PCT Filed: Jun. 23, 2020

(86) PCT No.: PCT/EP2020/067458
§ 371 (c)(1),
(2) Date: Dec. 27, 2021

(87) PCT Pub. No.: WO2020/260258
PCT Pub. Date: Dec. 30, 2020

(65) Prior Publication Data
US 2022/0260020 A1    Aug. 18, 2022

(30) Foreign Application Priority Data
Jun. 27, 2019    (DE) .......................... 102019117414.7

(51) Int. Cl.
*F02C 7/36* (2006.01)
*F01D 15/12* (2006.01)
(Continued)

(52) U.S. Cl.
CPC ................ *F02C 7/36* (2013.01); *F01D 15/12* (2013.01); *F01D 21/045* (2013.01); *F02C 7/06* (2013.01);
(Continued)

(58) Field of Classification Search
CPC ...... F02C 7/36; F02C 7/06; F02K 3/06; F01D 15/12; F01D 21/045; F05D 2220/323;
(Continued)

(56) References Cited

U.S. PATENT DOCUMENTS 4,201,513 A    5/1980    Sales
4,313,712 A    2/1982    Briggs
(Continued)

FOREIGN PATENT DOCUMENTS

GB    1458532 A    * 12/1976    ........... F01D 21/045
GB    2323637 A    *  9/1998    ........... F01D 21/045

OTHER PUBLICATIONS

German Search Report dated Feb. 13, 2020 from counterpart German Patent Application No. 10 2019 117 414.7.
(Continued)

*Primary Examiner* — Steven M Sutherland
(74) *Attorney, Agent, or Firm* — Shuttleworth & Ingersoll, PLC; Timothy J. Klima

(57) ABSTRACT

A gas turbine engine for an aircraft that includes a nacelle, a fan, an engine core, a bypass duct extending between the engine core and the nacelle and guiding a bypass airflow through the bypass duct, and at least one non-structural strut extending in the radial direction within the bypass duct, wherein the non-structural strut includes an outside wall acting as a heat exchanger, and wherein the outside wall includes first transport means configured to transport in the outside wall at least one fluid to be cooled. It is provided that the non-structural strut further includes second transport means configured to transport a fluid to be heated, wherein the first transport means and the second transport means are configured such that the fluid to be heated is heated by the
(Continued)

at least one fluid to be cooled and the at least one fluid to be cooled is cooled both by the bypass airflow and the fluid to be heated.

15 Claims, 6 Drawing Sheets

(51) Int. Cl.
  *F01D 21/04* (2006.01)
  *F02C 7/06* (2006.01)
  *F02K 3/06* (2006.01)
(52) U.S. Cl.
  CPC .......... *F02K 3/06* (2013.01); *F05D 2220/323* (2013.01); *F05D 2220/327* (2013.01); *F05D 2220/36* (2013.01); *F05D 2260/40311* (2013.01)
(58) Field of Classification Search
  CPC ........... F05D 2220/327; F05D 2220/36; F05D 2260/40311

USPC .............................................. 60/779, 39.091
See application file for complete search history.

(56) References Cited

U.S. PATENT DOCUMENTS

| | | |
|---|---|---|
| 4,375,906 A | 3/1983 | Roberts et al. |
| 4,452,567 A | 6/1984 | Treby et al. |
| 6,109,022 A | 8/2000 | Allen et al. |
| 2016/0305490 A1 | 10/2016 | Rix et al. |
| 2018/0080504 A1 | 3/2018 | Boniface |

OTHER PUBLICATIONS

International Search Report dated Oct. 6, 2020 from counterpart International Patent Application No. PCT/EP2020/67458.

* cited by examiner

STRUCTURAL ASSEMBLY FOR A GAS TURBINE ENGINE

This application is the National Phase of International Application PCT/EP2020/066049 filed Jun. 10, 2020 which designated the U.S.

This application claims priority to German Patent Application No. DE 10 2019 116 240.8 filed Jun. 14, 2019, which applications are incorporated by reference herein.

The invention relates to a structural assembly for a gas turbine engine according to the present disclosure and to a gas turbine engine having a structural assembly of this kind. The structural assembly serves to protect the gas turbine engine when a fan blade is lost.

The loss of a fan blade of an engine, for example as a result of a bird strike or material fatigue, leads to extreme loads in the form of a large imbalance in the engine. This is associated with powerful revolving radial loads in the bearings of the fan shaft. After the loss of a fan blade, the engine is shut down.

U.S. Pat. No. 4,375,906 A discloses a structural assembly of the type in question for a gas turbine engine, which has a forked turbine shaft that is coupled to a fan and comprises a radially outer fan shaft and a radially inner fan shaft. In normal operation, loads are transmitted via the radially outer fan shaft. When a fan blade is lost, a safety device consisting of shear pins is activated, thereby severing the connection between the fan and the radially outer fan shaft, with the result that loads are then transmitted via the radially inner fan shaft.

U.S. Pat. No. 6,109,022 A discloses the use of radially acting elastic elements to counteract orbiting of a fan shaft after the loss of a fan blade.

It is the underlying object of the invention to make available a structural assembly for a gas turbine engine which reduces the occurring loads after the loss of a fan blade over a wide rotational speed range of the fan shaft.

This object is achieved by a structural assembly and by a gas turbine engine having features as disclosed herein. Refinements of the invention are also indicated in the present disclosure.

According thereto, the invention considers a structural assembly for a gas turbine engine for protecting the gas turbine engine when a fan blade is lost. The structural assembly comprises a fan having a fan disk and a multiplicity of fan blades and a forked fan shaft, which is coupled to the fan. The forked fan shaft has a radially outer fan shaft and a radially inner fan shaft arranged within the radially outer fan shaft. The radially outer fan shaft is provided and designed to transmit a torque to the fan in normal operation of the fan, wherein the outer fan shaft is connected to the fan by means of a predetermined breaking point. It is furthermore mounted in a bearing. The radially inner fan shaft is fixedly connected to the fan, i.e. without there being a predetermined breaking point. The radially inner fan shaft and the radially outer fan shaft merge into one another downstream of the bearing and are accordingly fixedly connected to one another at a connection point. This connection point forms the end of the forking of the fan shaft. The predetermined breaking point is designed in such a way that the predetermined breaking point breaks when a fan blade is lost owing to the eccentric rotation of the fan which then occurs. In this case, the fan is then connected only to the radially inner fan shaft.

Provision is made for the structural assembly to have a contact mechanism which is activated by a decrease in the rotational speed of the fan shafts and which couples the radially inner fan shaft to the radially outer fan shaft when the rotational speed of the fan shafts falls below a predefined rotational speed after the predetermined breaking point breaks. After the fan shafts have been coupled by the contact mechanism, radially acting forces are transmitted from the radially inner fan shaft to the radially outer fan shaft.

The present invention is based on the concept of using a contact mechanism to reestablish coupling between the radially inner fan shaft and the radially outer fan shaft, previously broken by the breaking of the predetermined breaking point, after the rotational speed of the radially inner fan shaft and the radially outer fan shaft has fallen below a predefined value. The load path between the radially inner fan shaft and the radially outer fan shaft is thus reestablished after the breaking of the predetermined breaking point when the rotational speed has fallen to a predefined value. This ensures that the forces acting on the radially inner fan shaft owing to the loss of the fan blade can be transmitted directly from the radially inner fan shaft to the radially outer fan shaft and can be absorbed by the bearing assembly of the radially outer fan shaft. In particular, it is thereby possible to prevent the radially inner fan shaft from getting into resonant vibration owing to the forces acting thereon.

The solution according to the invention thus makes it possible to reduce the loads caused by the loss of a fan blade over a wide range of rotational speeds of the fan shaft. Two phases may be distinguished here. The first phase begins immediately after the breaking of the predetermined breaking point, the predetermined breaking point being designed in such a way that it breaks on account of the imbalance forces which occur after the loss of a fan blade. When the predetermined breaking point breaks, there is no longer any force transmission between the fan and the radially outer fan shaft. All the forces which arise from the imbalance of the fan are introduced into the radially inner fan shaft and, from the latter, are introduced into the bearing of the radially outer fan shaft (and any further bearing arranged downstream) via the indirect route of the connection point between the radially inner fan shaft and the radially outer fan shaft. Owing to the fact that the radially inner fan shaft has a lower bending stiffness, the resonant frequencies which occur in the radially inner fan shaft are shifted toward lower frequencies as compared with the situation if the forces that arose from the imbalance of the fan were transmitted into the radially outer fan shaft. At the rotational speeds of the fan blade after a fan blade has been lost, which are initially still high, the loads which occur are thus reduced.

The first phase ends and the second phase begins when the contact mechanism has been activated and the radially inner fan shaft is once again coupled to the radially outer fan shaft. This coupling, which allows transmission of radial forces from the radially inner fan shaft to the radially outer fan shaft, reestablishes the load path between the radially inner fan shaft and the radially outer fan shaft, ensuring that the forces which occur are transmitted directly to the radially outer fan shaft and the bearing thereof without taking the indirect route via the connection point between the radially inner fan shaft and the radially outer fan shaft. This preferably takes place at a time at which the radially inner fan shaft has not yet entered into resonance, thus ensuring that the loads which occur are relatively low even in the second phase, when the rotational speed of the fan shaft has fallen below a predefined value. Thus, by means of the contact mechanism, the original state, i.e. the state before the breaking of the predetermined breaking point between the radially inner fan shaft and the radially outer fan shaft, is as it were reestablished before the radially inner fan shaft enters into resonance.

Attention is drawn to the fact that the radially inner fan shaft and the radially outer fan shaft always rotate at the same speed by virtue of the connection between them. It is furthermore pointed out that the gas turbine engine decelerates after the loss of a fan blade, and therefore the rotational speed of the fan blade decreases continuously.

The activation of the contact mechanism also automatically brings about centering of the radially inner fan shaft relative to the radially outer fan shaft. This is because activation of the contact mechanism initiates transmission of radially acting forces of the radially inner fan shaft to the radially outer fan shaft and the bearing thereof. Vibrations of the radially inner fan shaft are suppressed.

One embodiment of the invention envisages that the contact mechanism has a plurality of contact elements, which are spaced apart in the circumferential direction, are connected to the inside of the radially outer fan shaft, are aligned substantially axially in normal operation of the fan and are aligned increasingly in a radially inward direction as the rotational speed of the fan shafts decreases (and therefore as a centrifugal force acting on the contact elements decreases), wherein the contact elements are designed in such a way that they enter into contact with the radially inner fan shaft below the predefined rotational speed. This embodiment provides a contact mechanism which is activated passively, solely by a drop in rotational speed, and has contact elements whose alignment is dependent on the rotational speed.

For this purpose, one embodiment envisages that the contact elements are designed as spring-loaded elongate elements which are connected at one end thereof to the inside of the radially outer fan shaft and are subject to a radially inward spring force which tends to align them radially, wherein the spring-loaded elongate elements move radially inward as the rotational speed decreases, and enter into contact with the radially inner fan shaft when the predefined rotational speed is undershot. The spring-loaded elongate elements are thus acted upon, on the one hand, by a spring force which tends to align the elongate elements radially and, on the other hand, by the centrifugal force, which tends to align the elongate elements axially or to press them against the inner wall of the radially outer fan shaft. The alignment of the elongate elements thus depends on the rotational speed. Determination of the spring force makes it possible to carry out an adjustment such that, when the predefined rotational speed is undershot, the elongate elements enter into contact with the radially inner fan shaft and, in the process, provide coupling between the radially inner fan shaft and the radially outer fan shaft.

The contact mechanism furthermore comprises a fastening mechanism, which holds the contact elements on the radially inner fan shaft after they have entered into contact with the radially inner fan shaft. As a result, the contact elements or spring-loaded elongate elements can reliably perform the function of transmitting radial forces from the radially inner fan shaft to the radially outer fan shaft.

One embodiment for this purpose envisages that the radially inner fan shaft has a radial collar, which is positioned axially in relation to the contact elements in such a way that, when the predefined rotational speed is undershot, the contact elements latch in on the radial collar inasmuch as, after making contact with a side face of the radial collar in an oblique orientation, they can then no longer be moved radially outward since this would lead to shortening or compression of the material of the contact elements. In particular, provision can be made for the contact elements to have a length and rotational speed-dependent alignment such that they come to bear successively on the side face of the radially inner collar when the rotational speed of the radially inner fan shaft decreases after the predetermined breaking point breaks.

According to this embodiment, the individual contact elements are successively captured during the radial deflection of the radially inner fan shaft after the breaking of the predetermined breaking point and before the complete activation of the contact mechanism in that, in a state of relatively great deflection of the radially inner fan shaft, the contact elements enter into contact with the collar and, in the case of reduced deflection of the radially inner fan shaft, inevitably maintain this contact since they are then deflected radially to a greater extent, and a return movement of the respective contact element to a horizontal alignment would increase their extent in the axial direction, but this is not possible owing to the collar. Here, provision is made for the contact elements to be composed of a substantially incompressible material which is not shortened or not substantially shortened when subject to pressure in the longitudinal direction. Most solid bodies, including metals and steel, satisfy this criterion.

One embodiment of the invention envisages that the spring-loaded elements are designed as prestressed leaf springs which are fastened at one end thereof to the inside of the radially outer fan shaft. In this embodiment, the provision of a hinge is not necessary. An alternative embodiment envisages that the spring-loaded elongate elements are each connected by means of a hinge and a torsion spring at one end thereof to the inside of the radially outer fan shaft. In principle, however, it is not the exact construction of the spring-loaded elements which is critical but only their function of aligning themselves to a greater and greater extent in the radial direction between the radially inner fan shaft and the radially outer fan shaft as the rotational speed decreases or the centrifugal force acting on them decreases.

As already mentioned, one embodiment of the invention envisages that the radially inner fan shaft has a lower bending stiffness than the radially outer fan shaft. As a result, the occurring resonant frequencies of the radially inner fan shaft are shifted toward lower frequencies.

According to another embodiment of the invention, the contact mechanism is designed in such a way that the radially inner fan shaft is coupled to the radially outer fan shaft before the radially inner fan shaft achieves resonance. This prevents resonance of the radially inner fan shaft resulting in high loads.

One design variant can provide for the radially inner fan shaft to have a deflection limiter, which limits radial deflection of the radially inner fan shaft relative to the radially outer fan shaft when the predetermined breaking point breaks. It should be noted here that the radial loads which occur after the loss of a fan blade lead inter alia to the radially inner fan shaft performing an eccentric orbiting motion, also referred to as orbiting. This is not a matter of the actual rotation of the fan shaft but of a motion superimposed on the rotation of the fan shaft. The deflection limiter prevents excessive amplitudes of such an orbiting motion. In one embodiment, it is possible here for the deflection limiter to be provided by the abovementioned collar connected to the radially inner fan shaft.

The contact elements are fastened equidistantly in the circumferential direction, for example, to the inside of the radially outer fan shaft. Furthermore, they are fastened to the inside of the radially outer fan shaft at the same axial position, for example.

According to another aspect of the invention, the invention relates to a gas turbine engine having a structural assembly according to claim 1. Provision may be made for the gas turbine engine to have:

an engine core which comprises a turbine, a compressor and a turbine shaft connecting the turbine to the compressor and formed as a hollow shaft;

a fan which is positioned upstream of the engine core; and a gear box that receives an input from the turbine shaft and outputs drive for the fan via a fan shaft so as to drive the fan at a lower rotational speed than the turbine shaft, wherein the fan and fan shaft are connected by a structural assembly according to the invention.

One design embodiment in this regard may provide that the turbine is a first turbine, the compressor is a first compressor, and the turbine shaft is a first turbine shaft;

the engine core further comprises a second turbine, a second compressor, and a second turbine shaft which connects the second turbine to the second compressor; and the second turbine, the second compressor, and the second turbine shaft are disposed with a view to rotating at a higher rotational speed than the first turbine shaft.

It is pointed out that the present invention is described with reference to a cylindrical coordinate system which has the coordinates x, r, and φ. Here, x indicates the axial direction, r indicates the radial direction, and φ indicates the angle in the circumferential direction. The axial direction is in this case identical to the machine axis of a gas turbine engine in which the structural assembly is arranged. Proceeding from the x-axis, the radial direction points radially outward. Terms such as "in front of", "behind", "front", and "rear" refer to the axial direction, or the flow direction in the engine. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, second compressor and second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of a non-limiting example, the overall pressure ratio of a gas turbine engine as described and/or claimed herein at constant speed can be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}$, 105 $Nkg^{-1}$, 100 $Nkg^{-1}$, 95 $Nkg^{-1}$, 90 $Nkg^{-1}$, 85 $Nkg^{-1}$ or 80 $Nkg^{-1}$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least some of the fan blades can be machined from a block and/or at least some of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawings.

Figure 4:
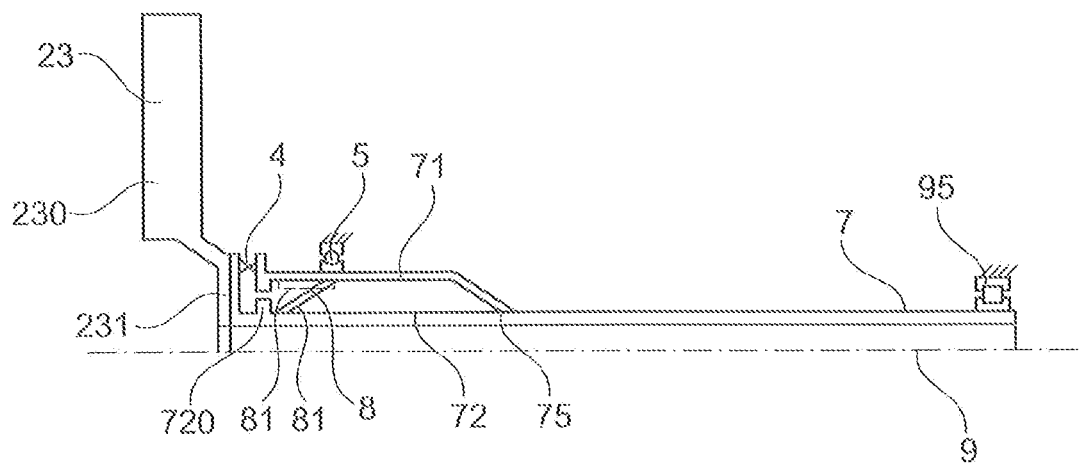
FIG. 4 shows schematically a structural assembly of a gas turbine engine for protecting the gas turbine engine when a fan blade is lost, wherein the structural assembly has a forked fan shaft and a contact mechanism which couples the radially inner fan shaft to the radially outer fan shaft when a predefined rotational speed is undershot.
Figure 5:
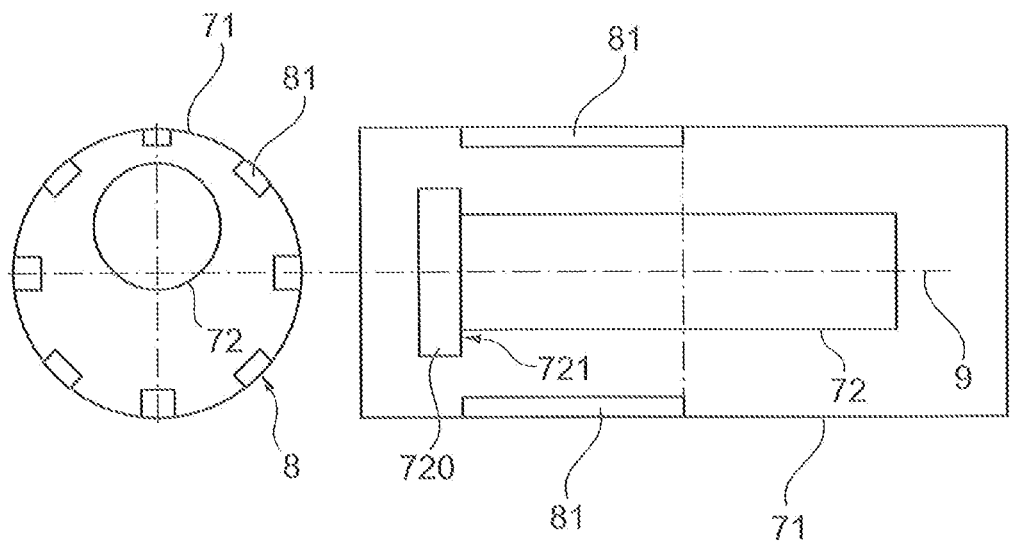
Figure 6:
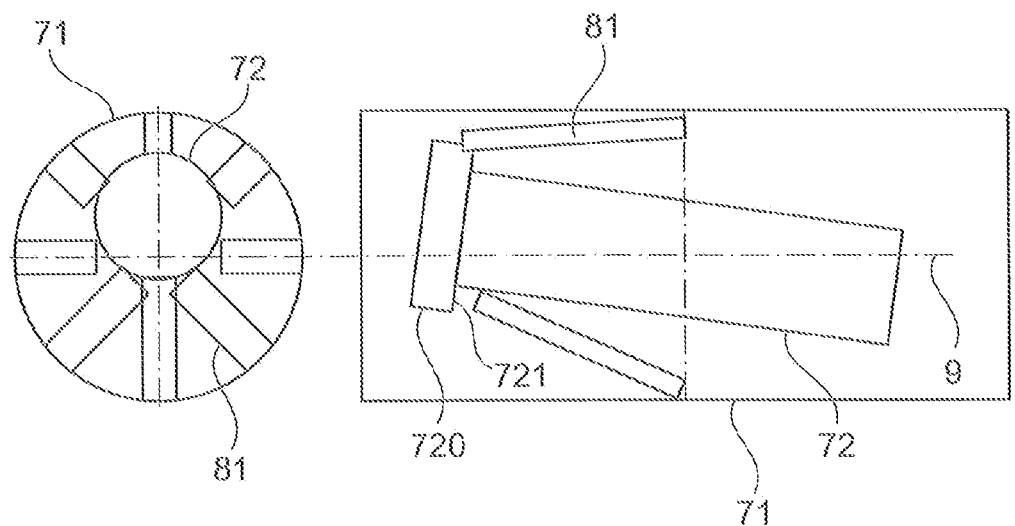
Figure 7:
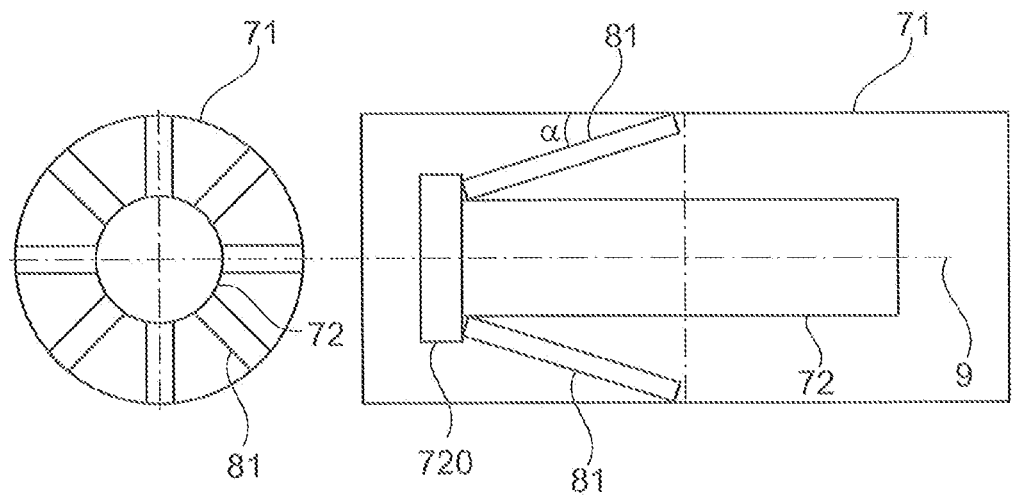
Figure 8:
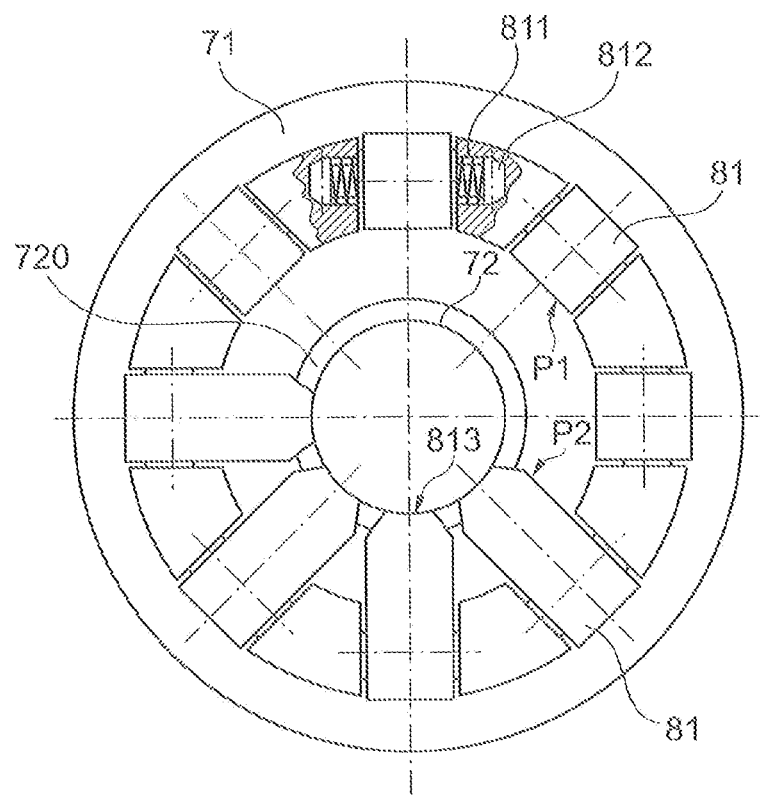
Figure 9:
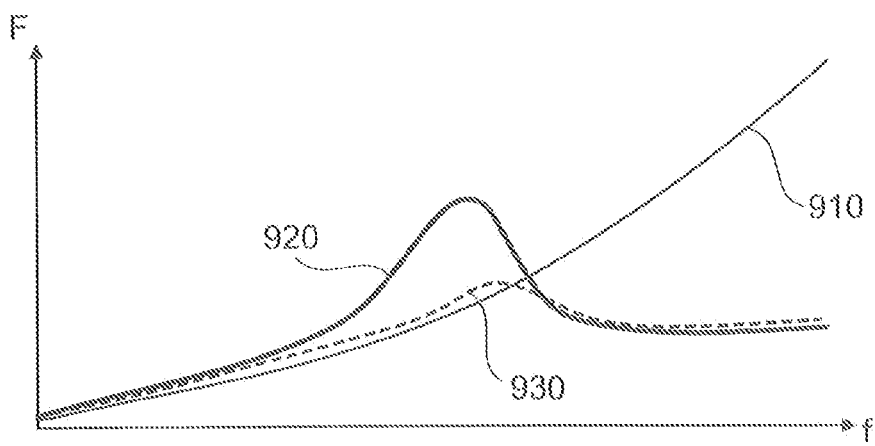
Figure 10:
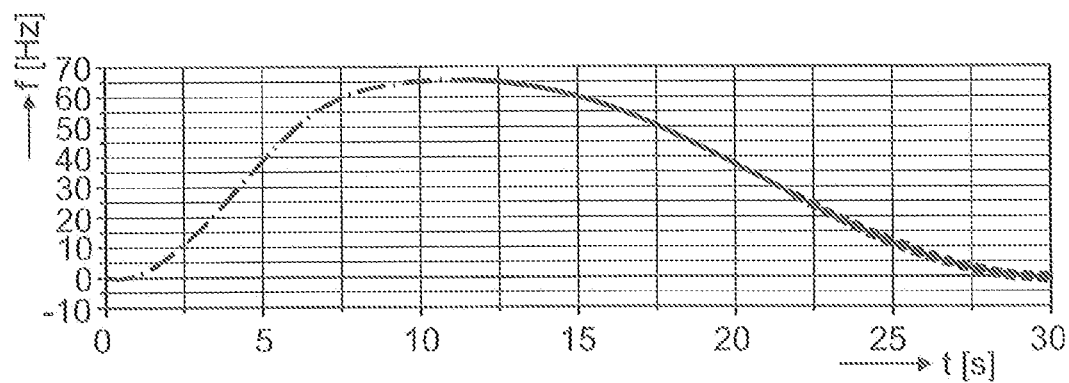
Figure 11:
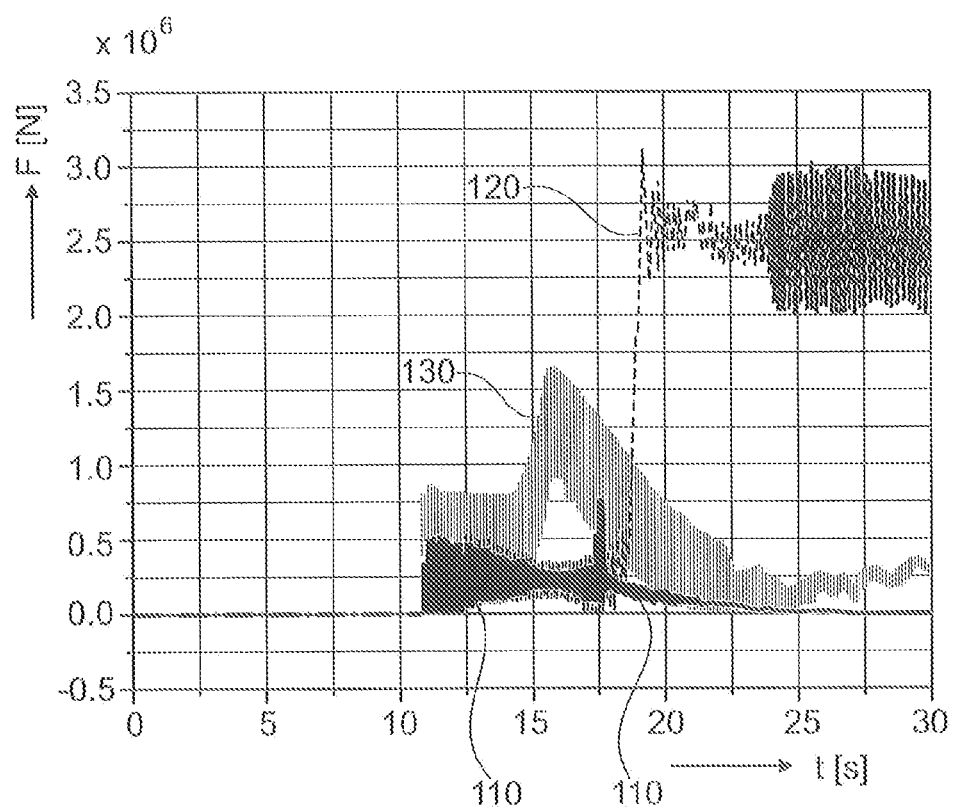

FIG. 5 shows, in cross section and longitudinal section, an exemplary embodiment of a forked fan shaft and of a contact mechanism of a structural assembly according to FIG. 4, wherein the contact mechanism has a plurality of spring-loaded elongate elements, the alignment of which is dependent on the rotational speed, wherein FIG. 5 shows the spring-loaded elongate elements in axial alignment, which is established at a high rotational speed;

FIG. 6 shows the arrangement of FIG. 5, wherein the spring-loaded elongate elements are aligned radially to a relatively great extent and enter into contact with the radially inner fan shaft, which is subject to bending vibrations;

FIG. 7 shows the arrangement of FIG. 5, wherein the spring-loaded elongate elements are aligned radially to the maximum extent and are in contact with the radially inner fan shaft, wherein the spring-loaded elongate elements couple the radially inner fan shaft to the radially outer fan shaft;

FIG. 8 shows, in a cross-sectional view, another exemplary embodiment of a contact mechanism which has a plurality of spring-loaded elongate elements, wherein the spring-loaded elongate elements are fastened to the inside of the radially outer fan shaft by means of a spring-loaded joint;

FIG. 9 shows the forces which occur when a fan blade is lost as a function of the rotational speed of the fan shaft for scenarios according to the prior art and to the invention;

FIG. 10 shows the characteristic of the rotational speed of a fan shaft as a function of time when there is a blade loss and a subsequent shutdown of the gas turbine engine; and FIG. 11 shows the radial forces which occur after the loss of a fan blade as a function of time for scenarios according to the prior art and to the invention on the basis of an illustrative calculation.

Figure 1:
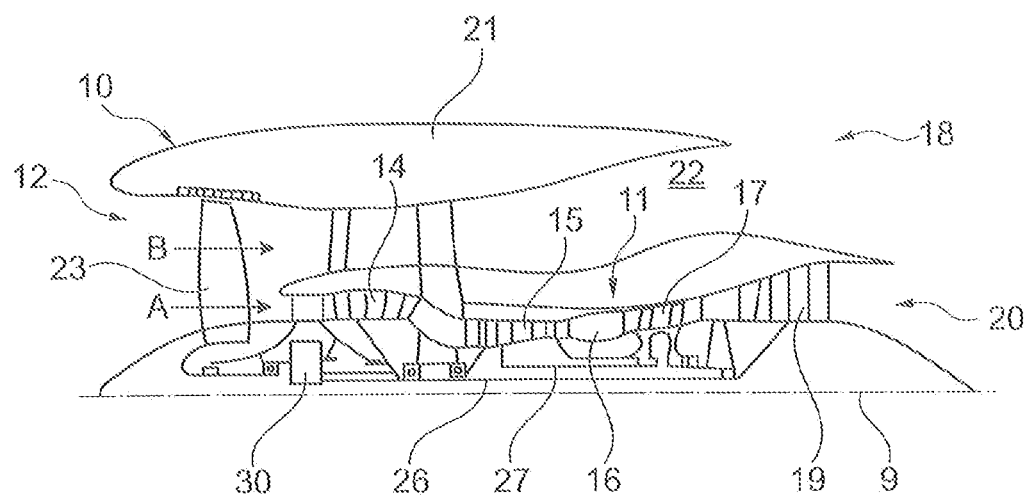
FIG. 1 shows a lateral sectional view of a gas turbine engine.

FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
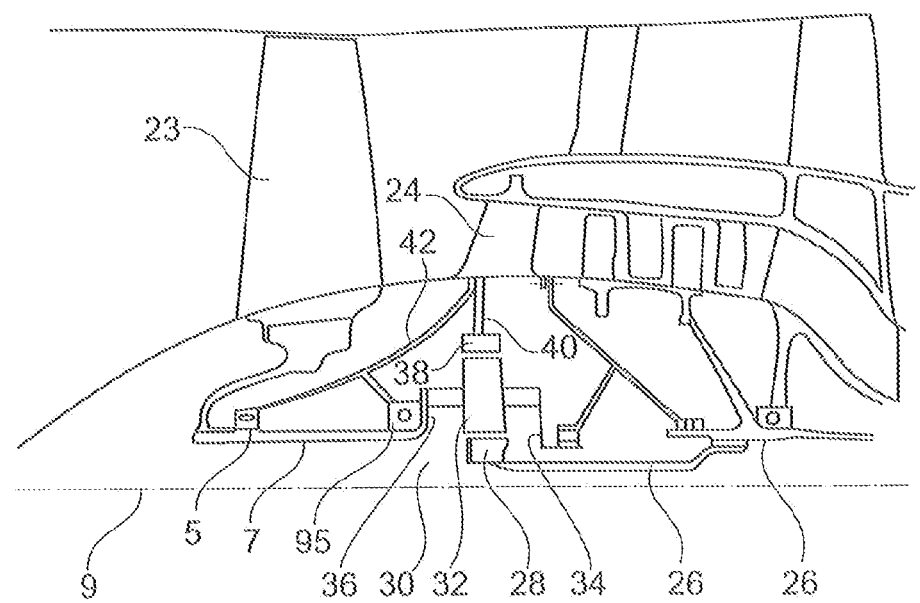
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
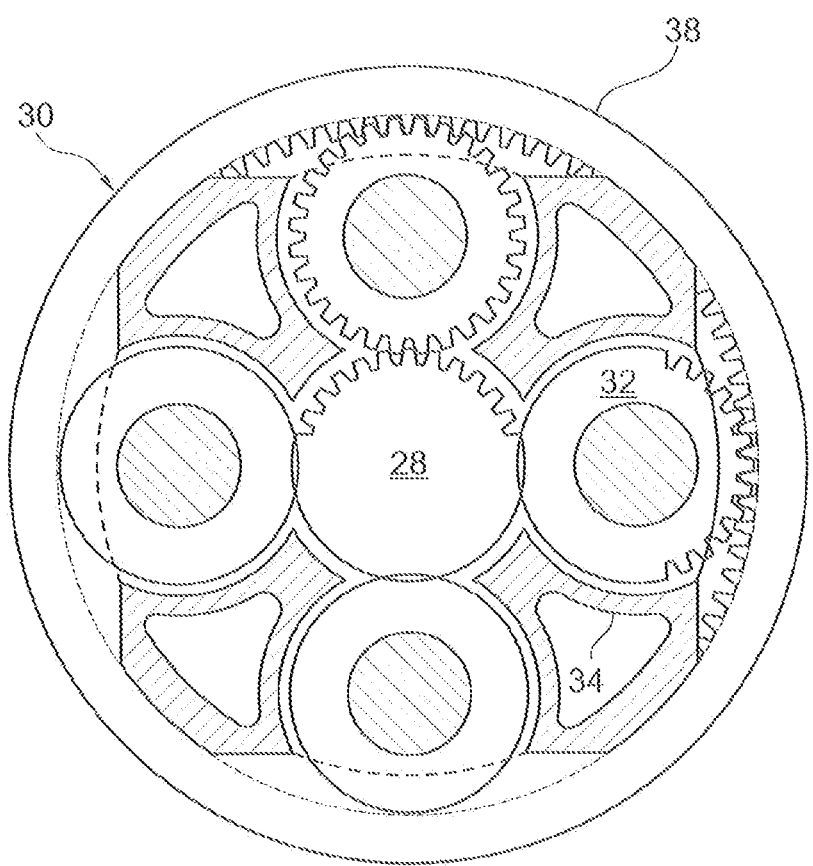
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in that the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has its own nozzle, which is separate from the engine core nozzle 20 and is radially on the outside with respect to the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 may not comprise a gear mechanism 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

FIG. 2 also shows the fan shaft 7 which is coupled on the output side to the planetary gear box 30 and is mounted by means of a front bearing 5 and a rear bearing 95. The static components of the bearings 5, 95 are connected here to a fan housing 42 which is part of the stationary support structure 24. The stationary support structure 24 is connected to an engine mount via which the gas turbine engine is secured on the fuselage of the aircraft or on a wing of the aircraft.

In the context of the present invention, the coupling of the fan 23 to the fan shaft 7 or, more generally, to a turbine shaft when a fan blade is lost, as well as the design of the fan shaft or turbine shaft, are significant.

FIG. 4 shows the components of a structural assembly which comprises a fan 23 and a forked fan shaft 7 coupled to the fan 23. The fan shaft 7 is, for example, a fan shaft corresponding to FIG. 2, which is driven by a reduction gear. As an alternative, however, it is possible to provide for the fan shaft to drive a turbine shaft which directly drives the fan 23, i.e. without a reduction gear in between. The present invention can be used both in gas turbine engines with a reduction gear and in gas turbine engines without a reduction gear.

In the context of the present description, any shaft which drives the fan is referred to as a fan shaft, irrespective of whether the fan is driven directly via a turbine shaft or via a reduction gear.

According to FIG. 4, the forked fan shaft 7 has a radially outer fan shaft 71 and a radially inner fan shaft 72 arranged within the radially outer fan shaft 71. The radially outer fan shaft 71 is mounted in a bearing 5, which is an axial and radial bearing, for example. The radially outer fan shaft 71 is furthermore connected to the fan 23 by means of a predetermined breaking point 4. The fan 23 comprises a fan disk 231 and a plurality of fan blades 230, which are connected to the fan disk 231. The radially outer fan shaft 71 is connected to the fan disk 231 by means of the predetermined breaking point 4. Where it is stated in the context of this description that the radially outer fan shaft 71 and/or the radially inner fan shaft 72 are/is connected to the fan 23, this is in each case a matter of a connection to the fan disk 231.

The radially inner fan shaft 72 is fixedly connected to the fan 23, i.e. without a predetermined breaking point. The radially inner fan shaft 72 and the radially outer fan shaft 71 merge into one another downstream of the bearing 5 and there form a connection point 75, at which they are fixedly connected to one another. Downstream of the connection point 75, the fan shaft 7 is no longer forked. A further bearing 95, which is a radial bearing for example, supports the fan shaft 7 jointly with bearing 5.

The structural assembly of FIG. 4 furthermore comprises a contact mechanism 8, which is activated passively as the rotational speed of the fan shafts 71, 72 decreases and which serves to couple the radially inner fan shaft 72 and the radially outer fan shaft 71 to one another again after the predetermined breaking point 4 breaks, as a result of which radially acting forces can be transmitted from the radially inner fan shaft 72 to the radially outer fan shaft 71 and absorbed by the bearing 5. As will be explained more particularly with reference to FIGS. 5 to 7, the contact mechanism 8 has spring-loaded elongate elements 81, the alignment of which depends on the rotational speed of the fan shafts 71, 72 and which enter into contact with the radially inner fan shaft 72 after a predefined rotational speed is undershot. In this arrangement, a collar 720 of the radially inner fan shaft 72 interacts with the contact mechanism 8.

The predetermined breaking point 4 is designed in such a way that it breaks at forces such as those which occur when a fan blade is lost. Provision may be made, for example, for the predetermined breaking point to comprise shear pins. In normal operation of the fan (i.e. when the latter is rotating and all the fan blades are intact), the fan 23 is driven by the fan shaft 7 and the radially outer fan shaft 71. Depending on design, the radially inner fan shaft 72 may also transmit a torque to the fan 23. After the predetermined breaking point 4 breaks, force transmission via the radially outer fan shaft 71 is interrupted.

Conversely, imbalance forces, which the fan 23 exerts owing to its imbalance after the loss of a fan blade, are not introduced into the radially outer fan shaft 71 but exclusively into the radially inner fan shaft 72. After the predetermined breaking point 4 breaks, the imbalance forces are transmitted from the radially inner fan shaft 72, via the connection point 75, to the radially outer fan shaft 71 and are absorbed by bearing 5 and, to a lesser extent, also by bearing 95. The situation here is that the radially inner fan shaft 72 has a lower bending stiffness than the radially outer fan shaft 71. This can be brought about by means of a different material and/or by means of a different design. Accordingly, the radially inner fan shaft 72 has resonant frequencies which are lower than the resonant frequencies which the radially outer fan shaft 71 would have without a predetermined breaking point 4 and decoupling from the fan 23.

This ensures that, in a first phase after the loss of a fan blade, when the rotational speed of the fan shaft 7 and of the fan 23 decreases to a rotational speed at which the contact mechanism engages, the forces acting radially on the bearings 5, 95 are reduced. This is because the shifting of the resonant frequencies toward lower frequencies prevents resonance of the radially inner fan shaft 71 in the high rotational speed range which is initially present after the loss of a fan blade. In this case, the resonant frequencies and the corresponding amplitudes of the vibration can be set by means of the geometry of the radially inner shaft 72 and the axial position of the connection point 75.

In the first phase after the loss of a fan blade, the collar 720 limits the maximum radial deflection of the radially inner fan shaft 72 relative to the radially outer fan shaft 71 and hence the amplitude of orbiting of the radially inner fan shaft 72. Additional collars may be provided for this purpose. The collar 720 thus acts as a deflection limiter.

The effect of force transmission via the radially inner fan shaft 72 after the predetermined breaking point 4 breaks is illustrated by the curves 910 and 920 in FIG. 9. Here, curve 910 shows the state without a predetermined breaking point, i.e. without the separation of the fan 23 and the radially outer fan shaft 71 when a fan blade is lost. After the loss of the fan blade, the gas turbine engine decelerates, and therefore the rotational speed decreases. The curves in FIG. 9 should thus be read from right to left. Owing to resonances which occur, the forces and loads which arise in curve 910 at high rotational speeds are very large and they decrease successively toward lower rotational speeds. Curve 910 corresponds substantially to the imbalance curve of the fan 23 and should be avoided owing to the high forces which occur. By transmission of the loads to the radially inner fan shaft 72 after the predetermined breaking point breaks, resonant frequencies are shifted toward lower frequencies, and therefore the loads which occur in the high rotational speed range immediately after the loss of a fan blade are significantly reduced.

When a predefined rotational speed is reached, the contact mechanism 8 cuts in, as described with reference to FIGS. 5 and 7. The contact mechanism 8 has a plurality of contact elements, which are arranged spaced apart in the circumferential direction and are designed as spring-loaded elongate elements 81 which are fastened at one end thereof to the inside of the radially outer fan shaft 71. A spring force acting on the contact elements 81 tends to move the contact elements 81 radially inward. According to one exemplary embodiment, the spring force is provided by the fact that the contact elements are designed as leaf springs. According to another exemplary embodiment, the contact elements are fastened to the inside of the radially outer fan shaft 71 by means of a spring-loaded joint, as will be explained by way of example with reference to FIG. 8.

FIG. 5 furthermore shows the collar 720 of the radially inner fan shaft 72, which is arranged in a defined axial position relative to the contact elements 81.

FIG. 5 shows the arrangement in a state in which the contact elements 81 are still aligned substantially in the axial direction owing to a high rotational speed. Owing to the rotational speed, the centrifugal force acting on the elements 81 counteracts the spring force acting in the radial direction and exceeds it.

In the left-hand sectional illustration in FIG. 5, it can furthermore be seen that the radially inner fan shaft 72 performs bending movements due to the forces introduced by the imbalance of the fan, and is deflected relative to a central position centered with respect to the radially outer fan shaft 71. In this case, the radial movements performed by the radially inner fan shaft 71 may be complex and comprise a multiplicity of bending vibrations at natural frequencies of the radially inner fan shaft and orbiting. The state illustrated in FIG. 5 can be referred to as supercritical.

FIG. 6 shows the state when the contact elements 81 of the contact device 8 enter into contact with the radially inner fan shaft 72. In this case, the rotational speed has fallen to such an extent that the contact elements 81 are aligned to a greater and greater extent in the radial direction. At the same time, the radially inner fan shaft 71 is subject to deflections from the central axis 9 owing to the forces acting thereon. In this case, the contact elements 81 enter into contact with the outer circumferential surface of the radially inner fan shaft 72. In a similar way, they come to bear in the axial direction against one side face 721 of the collar 720. All the contact elements 81 latch in successively on the radially inner fan shaft 72 and the collar 720 owing to the spring force acting on the contact elements 81 and the backward and forward movement of the radially inner fan shaft 71. When, in a state of relatively great deflection of the radially inner shaft 72, they enter into contact with the radially inner shaft 72 and, in a state of relatively little deflection of the radially inner shaft 72, they come to bear against the collar 720, they are fixed firmly on the radially inner shaft 72 since they are then deflected radially to a relatively great extent, and a return movement of the contact element 81 in the direction of the radially outer shaft 71 would enlarge the extent thereof in the axial direction, but this is prevented by the collar 720.

The state of completion to this extent is shown by FIG. 7. All the contact elements 81 are angled at an angle α relative to the axial direction and, at the ends, are in contact with the radially inner fan shaft 72, wherein the ends bear against the collar 720 of the radially inner fan shaft 72. This ensures that the contact elements are held against the radially inner fan shaft 72 and can no longer be moved radially outward. The elongate spring-loaded contact elements 81 can also be referred to as claws, which as it were hook in on the radially inner fan shaft 72. This is because, owing to the contact with the collar 720, a radially outward movement of the contact elements 81 would only be possible if the axial length of the contact elements 81, which is equal to the cosine of the angle α, were shortened. Owing to the stiffness or incompressibility of the contact elements 81, this is not possible, however. There is a locking effect.

Accordingly, the radially inner fan shaft 72 is centered in the middle by the contact elements 81 after the activation of the contact mechanism 8, and forces acting radially on the radially inner fan shaft 72 are then transmitted directly to the radially outer fan shaft 72 via the contact elements 81. The load path between the radially inner fan shaft 72 and the radially outer fan shaft 72, which has been broken by the breaking of the predetermined breaking point 4, is thus reestablished.

The state illustrated in FIG. 7 can be referred to as subcritical.

With the coupling of the radially inner fan shaft 72 to the radially outer fan shaft 71 by the contact mechanism 8, the first phase ends and a second phase begins, in which the load path between the radially inner fan shaft 72 and the radially outer fan shaft 71 is reestablished. Loads are then transmitted directly from the radially inner fan shaft 72 to the radially outer fan shaft 71 and the bearing 5. Resonance of the radially inner fan shaft 72 is thereby prevented. This is illustrated by means of curve 930 in FIG. 9. According to this, the coupling between the radially inner fan shaft and the radially outer fan shaft by the contact mechanism 8 starts at a rotational speed before the radially inner fan shaft 72 enters into resonance. A residual resonant rise is significantly less, and therefore the loads and forces F which occur overall are significantly reduced in comparison with curve 910 and also curve 920. The loads which occur are thus significantly reduced over a large rotational speed range.

FIG. 8 shows an illustrative embodiment in which the contact elements 81 are fastened in an articulated manner to the inside of the radially outer fan shaft 72. For this purpose, the contact elements 81 have a cylindrical joint 812 which is preloaded by a torsion spring 811, wherein the torsion spring 811 tends to align the contact elements 81 radially. Position P1 shows the contact elements 81 in an axial alignment, when they are aligned horizontally owing to the centrifugal force being stronger than the spring force. Position P2 shows the contact element 81 deflected to a greater extent radially, wherein the ends 813 of the contact elements 81 are resting against the radially inner fan shaft 72 and the collar 720 of the radially inner fan shaft 72.

The advantages obtained by means of the invention are further explained with reference to FIGS. 10 and 11. This is a computer simulation. FIG. 10 shows the characteristic of the rotational speed f of the fan or fan shaft after the loss of a fan blade as a function of time t. The loss of the fan blade occurs after 11 seconds. After this, the rotational speed f decreases successively to zero.

FIG. 11 shows the radial forces or loads acting on the radially inner fan shaft 72, likewise as a function of time t, with reference to a first simulation for three different scenarios. Once again, the loss of a fan blade occurs after 11 seconds. The contact mechanism 8 engages after 17 seconds.

Here, the scenario according to the invention corresponds to curve 110. The radial forces F, which occur abruptly after the loss of the fan blade, are relatively small and also remain relatively small when the contact mechanism engages after 17 seconds. In contrast, curve 120 indicates the radial forces which occur when the load path between the radially inner fan shaft 72 and the radially outer fan shaft 71 is not reestablished, and the radially inner fan shaft 72 enters into resonance. Up to the onset of the contact mechanism, curves 110 and 120 follow substantially the same path. When resonance occurs, this being prevented by the contact mechanism, significantly higher forces occur in curve 120. Curve 130 represents the situation without a predetermined breaking point between the radially outer fan shaft and the fan.

It will be understood that the invention is not limited to the embodiments described above, and various modifications and improvements can be made without departing from the concepts described herein. It is also pointed out that any of the features described may be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie in a range.

The invention claimed is:

1. A structural assembly for a gas turbine engine, comprising:
    a fan, which comprises a fan disk and a multiplicity of fan blades,
    a forked fan shaft, which is coupled to the fan and comprises a radially outer fan shaft and a radially inner fan shaft arranged within the radially outer fan shaft, wherein:
        the radially outer fan shaft is configured to transmit a torque to the fan in a normal operation of the fan, wherein the radially outer fan shaft is connected to the fan by a predetermined breaking point,
        the radially outer fan shaft is mounted in a bearing,
        the radially inner fan shaft is fixedly connected to the fan,
        the radially inner fan shaft and the radially outer fan shaft merge into one another downstream of the bearing and are fixedly connected to one another at a connection point, and
        the predetermined breaking point is configured to break when a fan blade is lost,
    a contact mechanism, which is activated by a decrease in a rotational speed of the radially inner and radially outer fan shafts and which couples the radially inner fan shaft to the radially outer fan shaft when the rotational speed of the radially inner and radially outer fan shafts falls below a predefined rotational speed after the predetermined breaking point breaks, wherein, after the radially inner and radially outer fan shafts have been coupled by the contact mechanism, radially acting forces are transmitted from the radially inner fan shaft to the radially outer fan shaft.

2. The structural assembly as claimed in claim 1, wherein the contact mechanism includes contact elements, which are spaced apart in a circumferential direction, are connected to an inside of the radially outer fan shaft, are aligned substantially axially in normal operation of the fan and are aligned increasingly in a radially inward direction as the rotational speed of the fan shafts decreases after the predetermined breaking point breaks, wherein the contact elements are configured to enter into contact with the radially inner fan shaft below the predefined rotational speed.

3. The structural assembly as claimed in claim 2, wherein the contact elements are configured as spring-loaded elongate elements which are connected at one end thereof to the inside of the radially outer fan shaft and are subject to a radially inward spring force which tends to align the contact elements radially, wherein the contact elements move radially inward as the rotational speed decreases, and enter into contact with the radially inner fan shaft when the predefined rotational speed is undershot.

4. The structural assembly as claimed in claim 2, wherein the contact mechanism comprises a fastening mechanism, which holds the contact elements on the radially inner fan shaft after the contact elements have entered into contact with the radially inner fan shaft.

5. The structural assembly as claimed in claim 4, wherein the radially inner fan shaft has a radial collar, which is positioned axially in relation to the contact elements such that, when the predefined rotational speed is undershot, the contact elements latch in on the radial collar such that, after making contact with a side face of the radial collar in an oblique orientation, the contact elements are no longer movable radially outward.

6. The structural assembly as claimed in claim 5, wherein the contact elements have a length and rotational speed-dependent alignment such that the contact elements come to bear successively on the side face of the radial collar when the rotational speed of the radially inner fan shaft decreases after the predetermined breaking point breaks.

7. The structural assembly as claimed in claim 2, wherein the contact elements are configured as prestressed leaf springs which are fastened at one end thereof to the inside of the radially outer fan shaft.

8. The structural assembly as claimed in claim 2, wherein the contact elements are each connected by a spring-loaded hinge or joint at one end thereof to the inside of the radially outer fan shaft.

9. The structural assembly as claimed in claim 2, wherein the contact elements are fastened equidistantly in the circumferential direction to the inside of the radially outer fan shaft.

10. The structural assembly as claimed in claim 2, wherein the contact elements are fastened to the inside of the radially outer fan shaft at a same axial position.

11. The structural assembly as claimed in claim 1, wherein the radially inner fan shaft has a lower bending stiffness than the radially outer fan shaft.

12. The structural assembly as claimed in claim 1, wherein the contact mechanism is configured such that the radially inner fan shaft is coupled to the radially outer fan shaft before the radially inner fan shaft achieves resonance.

13. The structural assembly as claimed in claim 1, wherein the radially inner fan shaft includes a deflection limiter, which limits radial deflection of the radially inner fan shaft relative to the radially outer fan shaft when the predetermined breaking point breaks.

14. A gas turbine engine comprising the structural assembly as claimed in claim 1.

15. The gas turbine engine as claimed in claim 14, and further comprising:
    an engine core which comprises a turbine, a compressor and a turbine shaft connecting the turbine to the compressor and formed as a hollow shaft;
    a fan, which is positioned upstream of the engine core; and
    a gear box, which receives an input from the turbine shaft and outputs drive for the fan via a fan shaft to drive the fan at a lower rotational speed than the turbine shaft;

wherein the fan and the fan shaft are connected by a structural assembly.

* * * * *